United States Patent [19]

Searby

[11] Patent Number: 5,523,917
[45] Date of Patent: Jun. 4, 1996

[54] POWER SUPPLY COVER

[75] Inventor: Tom J. Searby, Fort Collins, Colo.

[73] Assignee: Hewlett-Packard Co., Palo Alto, Calif.

[21] Appl. No.: 301,168

[22] Filed: Sep. 6, 1994

[51] Int. Cl.⁶ ..................................................... H05K 7/20
[52] U.S. Cl. ...................... 361/687; 312/223.2; 361/695; 361/720; 454/184
[58] Field of Search ................... 174/16.1, 66; 165/122, 165/126, 80.3; 454/184; 312/223.1, 223.2; 361/807, 809, 810, 736, 752, 690, 692–695, 719, 720, 683, 687

[56] References Cited

U.S. PATENT DOCUMENTS

| | | | |
|---|---|---|---|
| 4,926,291 | 5/1990 | Sarraf | 361/687 |
| 4,996,909 | 3/1991 | Vache | 98/1 |
| 5,051,868 | 9/1991 | Leverault | 361/395 |
| 5,136,468 | 8/1992 | Wong | 361/393 |
| 5,163,870 | 11/1992 | Cooper | 454/184 |
| 5,224,019 | 6/1993 | Wong | 361/393 |
| 5,323,291 | 6/1994 | Boyle | 361/683 |

OTHER PUBLICATIONS

"Industrial Computer - - - ", IBM Tech Discl Bull vol. 30 No. 3 Aug. 1987, pp. 1071–1075.

Primary Examiner—Gerald P. Tolin
Attorney, Agent, or Firm—Cynthia S. Baan

[57] ABSTRACT

A power supply cover that snaps into place inside a computer or workstation electronic assembly, secured to the outer walls of the electronic assembly, covering and securing a power supply board in place. The power supply cover provides safety from dangerous power supply voltages. The power supply cover includes a baffled, external speaker pocket that houses a speaker for the computer or workstation electronic assembly. The power supply cover also houses an internal fan that securely snaps in under the power supply cover. The position of the fan and the power supply cover's perforated walls direct the correct amount of air flow over the power supply board, the system board and the disk drives to permit proper heat dissipation of electronics. The power supply cover also provides structural support for heavy equipment that may be stacked on the electronic assembly, such as a monitor.

9 Claims, 10 Drawing Sheets

POWER SUPPLY COVER

FIELD OF THE INVENTION

The present invention relates generally to the field of computer power supply systems. In particular, this invention relates to a power supply cover within a computer or electronic enclosure.

BACKGROUND OF THE INVENTION

The current trend in personal computers and workstations is to decrease the size and weight of the overall system, while increasing the performance at the same time. One problem is the precious acreage on the main chassis and the internal walls of the computer enclosure. Another issue in the placement of internal components and electronics, is the routing of interconnect cables and buses. Other issues to be dealt with are the cost of assembly, computer housing safety requirements, cost of individual components, weight of individual components, and structural support of the computer housing.

For example, modern personal computers and workstations generally have a power supply that is enclosed in its own sheet metal housing for safety purposes and then fastened via screws or plastic thumb rivets into the main chassis of the electronic enclosure, which increases the cost and weight of both the power supply and the final computer assembly. Power supply boards are generally secured by means of screws or a dedicated snap-fit. Fans for cooling the internal devices and electronics of the computer system are generally mounted to the main chassis or to a secondary fan support/guide ribs using mounting hardware of sheet metal and screws or similar fasteners. Also, one or more fan guards are required for safety reasons in most situations. Structural support of the computer enclosure, so that the monitor, printer or other component can be stacked on top of the computer without damaging the internal electronics, is usually obtained by adding one or more sheet metal walls to the inside of the computer enclosure, which increases the component and assembly cost, the design complexity, and difficulty in routing internal interconnect cables and buses. Channeling airflow through the computer enclosure in order to cool internal electronic components generally requires additional walls or baffles which has similar disadvantages as providing structural support for the computer enclosure. Prior methods for mounting speakers inside a computer enclosure have been to enclose the speaker with an acoustical baffle and mount the assembly to a front wall of the computer enclosure, which has the disadvantages of (1) requiring additional part for baffling, (2) requiring fastening hardware or snap-fit design which affects the design of several parts, and (3) taking up outside wall real estate which reduces the amount of airflow inlet or outlet area.

In general, there is a need to decrease the size and weight of computer and workstation assemblies, to optimize the use of internal real estate—especially housing wall real estate, and to decrease the cost of individual components and overall assembly. Each of these objectives must be obtained while maintaining or improving the safety requirements of the assembly, maintaining or improving the routing of interconnect cables and buses, maintaining or improving the airflow through the computer enclosure, and maintaining or improving the structural support of the computer housing.

SUMMARY OF THE INVENTION

It is an aspect of the present invention to provide an improved power supply cover for a computer or workstation electronic assembly that decreases the number of parts used and optimizes the internal real estate of the electronic assembly.

It is another aspect of the present invention to provide an improved power supply cover for a computer or workstation electronic assembly that decreases the weight of the overall electronic assembly.

It is a further aspect of the present invention to provide an improved power supply cover for a computer or workstation electronic assembly that decreases the overall cost of components and manufacture of the electronic assembly.

It is yet a further aspect of the present invention to provide an improved power supply cover for a computer or workstation electronic assembly that maintains or improves the safety requirements of the electronic assembly.

It is yet a further aspect of the present invention to provide an improved power supply cover for a computer or workstation electronic assembly that maintains or improves the ease of routing internal cables and buses in the electronic assembly.

It is yet a further aspect of the present invention to provide an improved power supply cover for a computer or workstation electronic assembly that maintains or improves the airflow through the electronic assembly.

It is yet a further aspect of the present invention to provide an improved power supply cover for a computer or workstation electronic assembly that maintains or improves the structural support of the computer housing.

The above and other aspects of the present invention are accomplished in a stand alone, injection molded plastic power supply cover that snaps into place inside the computer or workstation electronic assembly, secured to the outer walls of the assembly, covering and securing the power supply board in place. The power supply cover includes a baffled, external speaker pocket that houses the speaker for the computer or workstation assembly. The power supply cover also houses an internal fan that securely snaps into place between the walls of the power supply cover. The position of the fan and the power supply cover's perforated walls direct the correct amount of air flow over the power supply board, the system board and the storage disk drives to provide adequate heat dissipation for the electronics of the computer or workstation assembly. The power supply cover also provides structural support for heavy equipment that may be stacked on the electronic assembly, such as a monitor.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
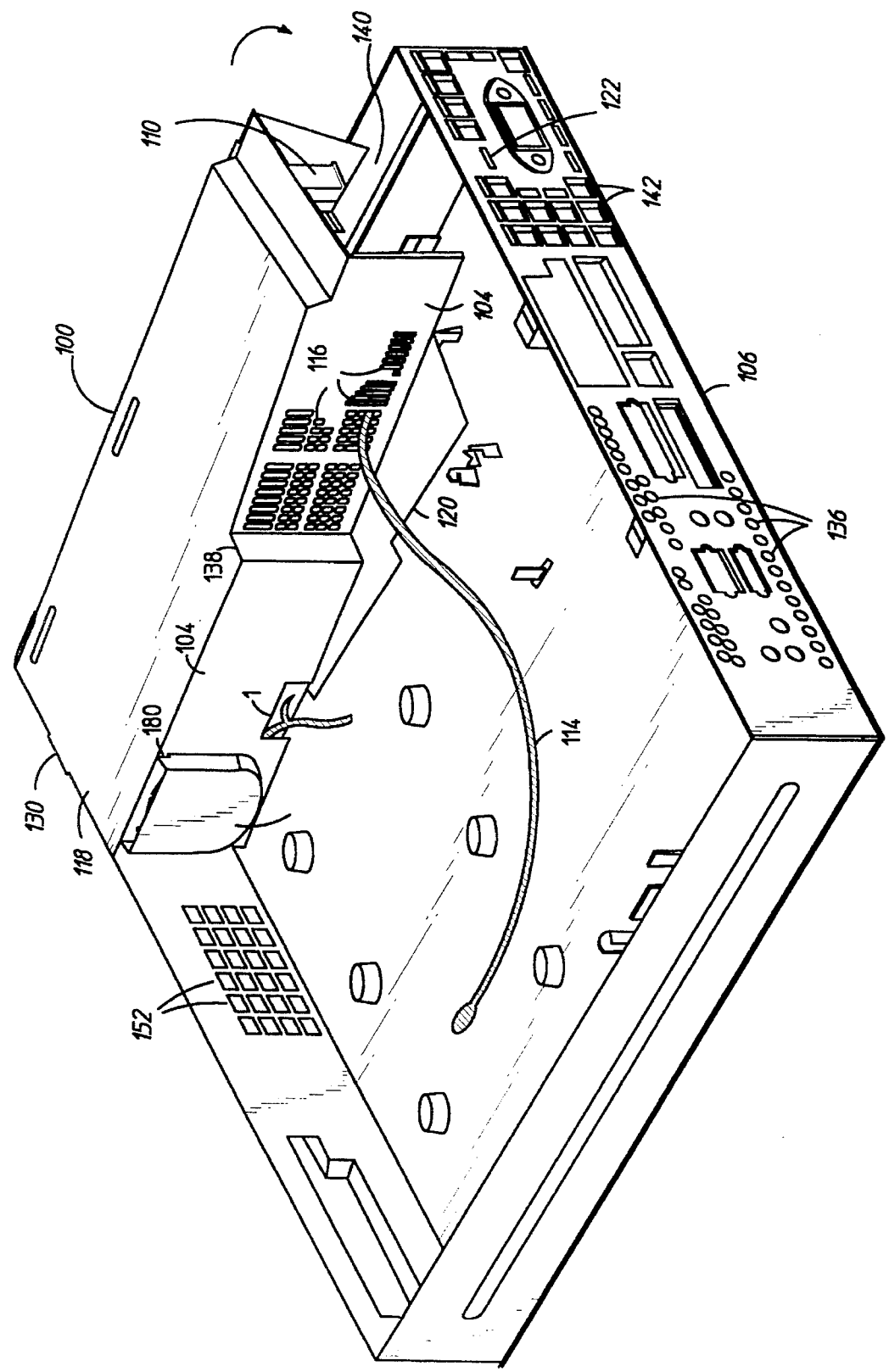
FIG. 1 shows a top perspective view of a computer chassis with a power supply cover according to the present invention.

FIGS. 1 through 10 depict a power supply cover 100 according to the present invention. The power supply cover 100 is generally used to cover a power supply printed circuit board (P.C.) 120 to meet safety regulations. Power supply cover 100 is preferably made of molded plastic, but can be made of any sturdy, nonconductive material. Power supply cover 100 comprises a first wall 104 that has a bend 138, a second partial wall 105, and a top surface 118. The first wall 104 contains air holes 116, fan cable slot 164, power supply P.C. board cable exit window 108, a first fan support/guide ribs 156, a first fan snap tab 154, power supply P.C. board securing tabs 158, and speaker pocket 102. The second partial wall 105 contains power supply P.C. board securing tabs 158, a second fan support/guide ribs 156, and a second fan snap tab 154. The power supply cover top surface 118 contains a tab 130 and a latch 110.

Figure 2:
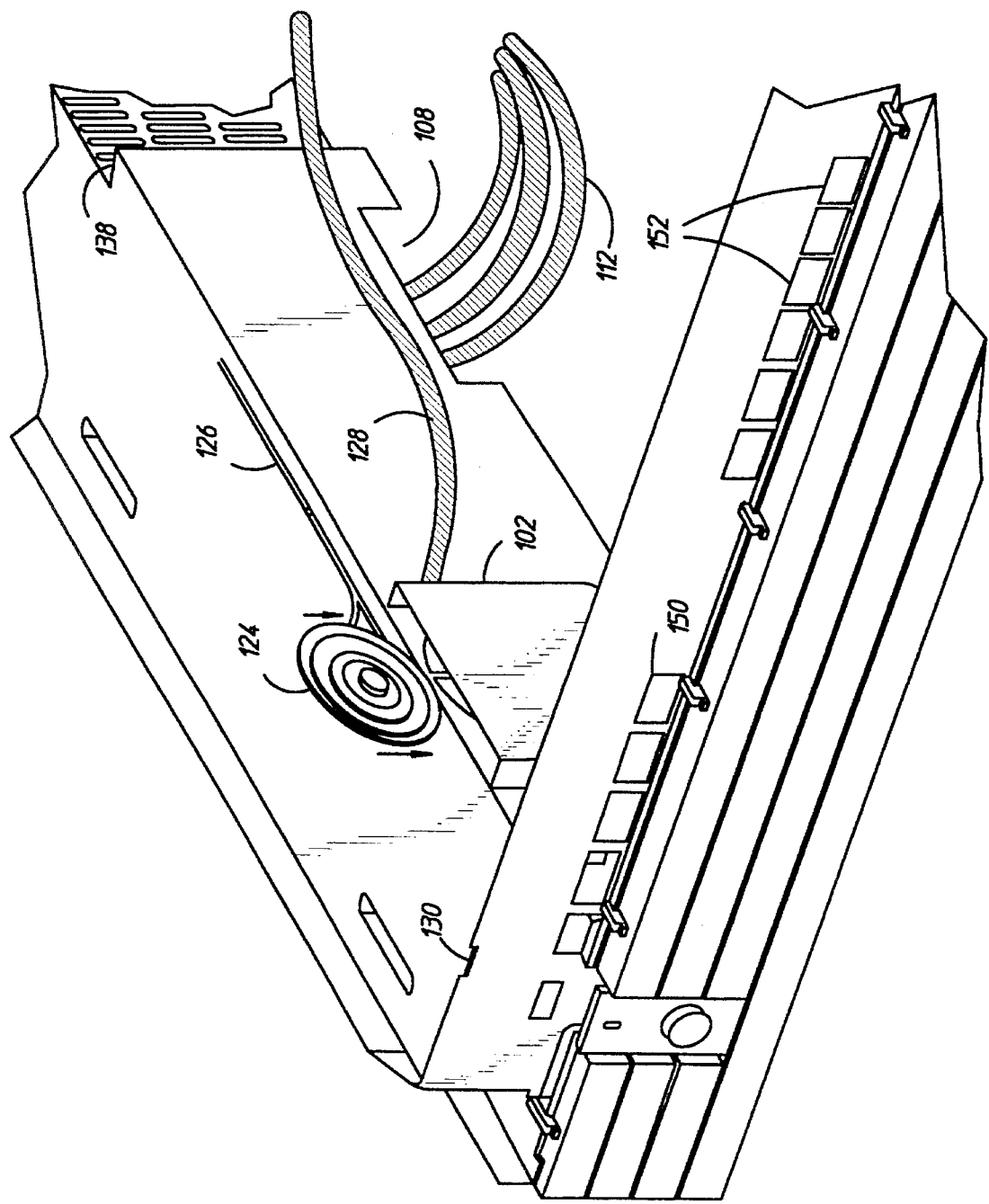
FIG. 2 shows a top perspective view of the power supply cover according to the present invention with a close-up of a speaker pocket.
Figure 3:
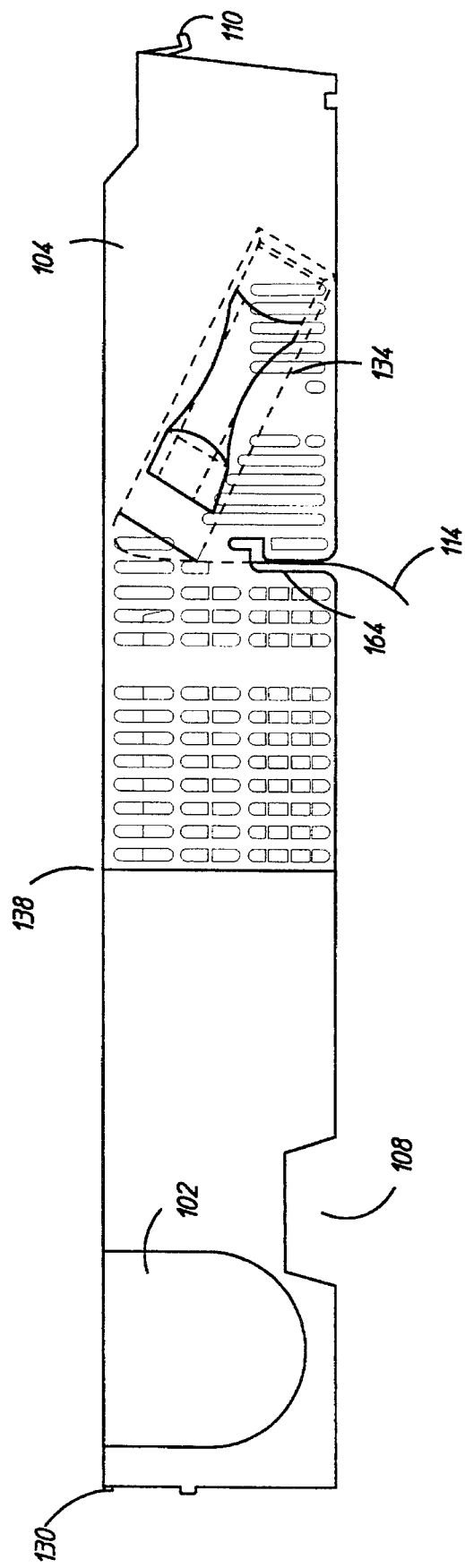
FIG. 3 shows a side view of the power supply cover according to the present invention with representation of the position of a fan inside the power supply.

As can be seen in FIGS. 1, 2, and 6–8, power supply cover 100 also has a speaker pocket 102 for holding a speaker 124 which slides or press fits into the speaker pocket 102. Speaker 124 has speaker cable 126 (128 shows the location of cable 126 when it is in the final position). Speaker pocket 102 has a cable notch 180 which holds the cable 126 along side of power supply cover 100. Speaker pocket 102 performs the function of and replaces a back baffle for speaker 124. Speaker pocket 102 also has a window 160 for directing sound from the speaker. The sound then travels along the internal chamber of the power supply cover 100 and exits the computer chassis at holes 150 (FIG. 2).

Figure 6:
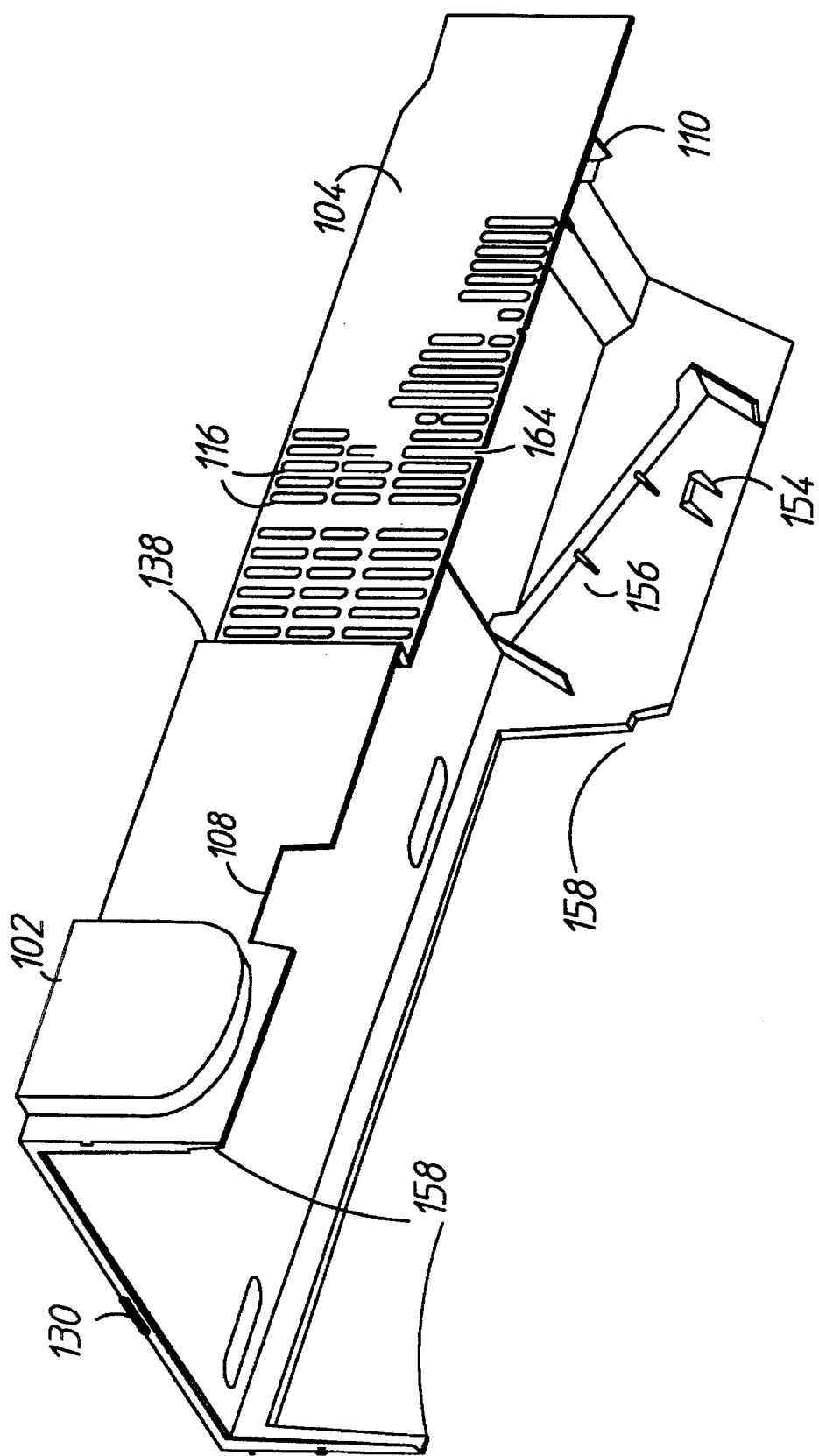
FIG. 6 shows a bottom/front side perspective view of the power supply cover according to the present invention.
Figure 7:
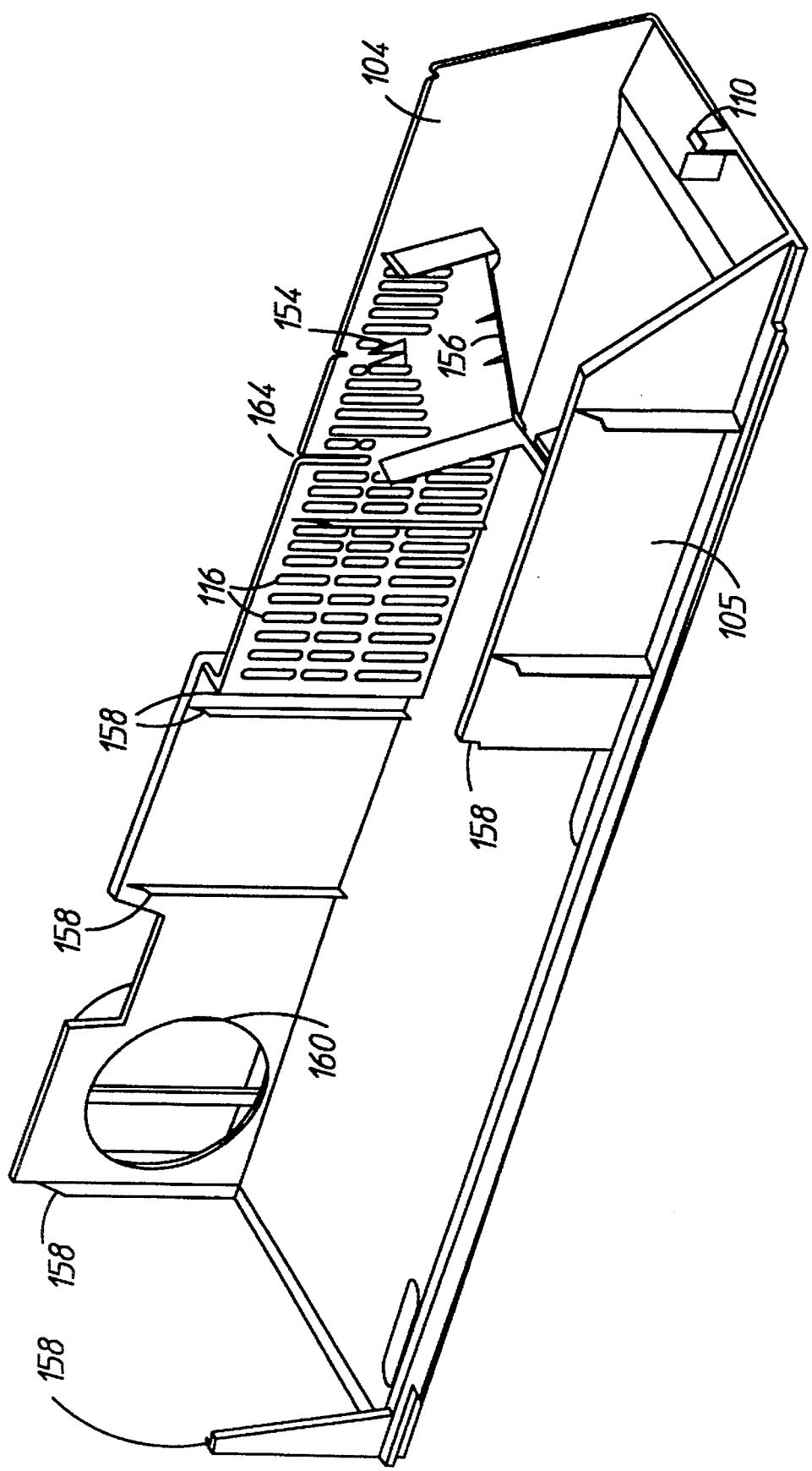
FIG. 7 shows a bottom/back side perspective view of the power supply cover according to the present invention.
Figure 8:
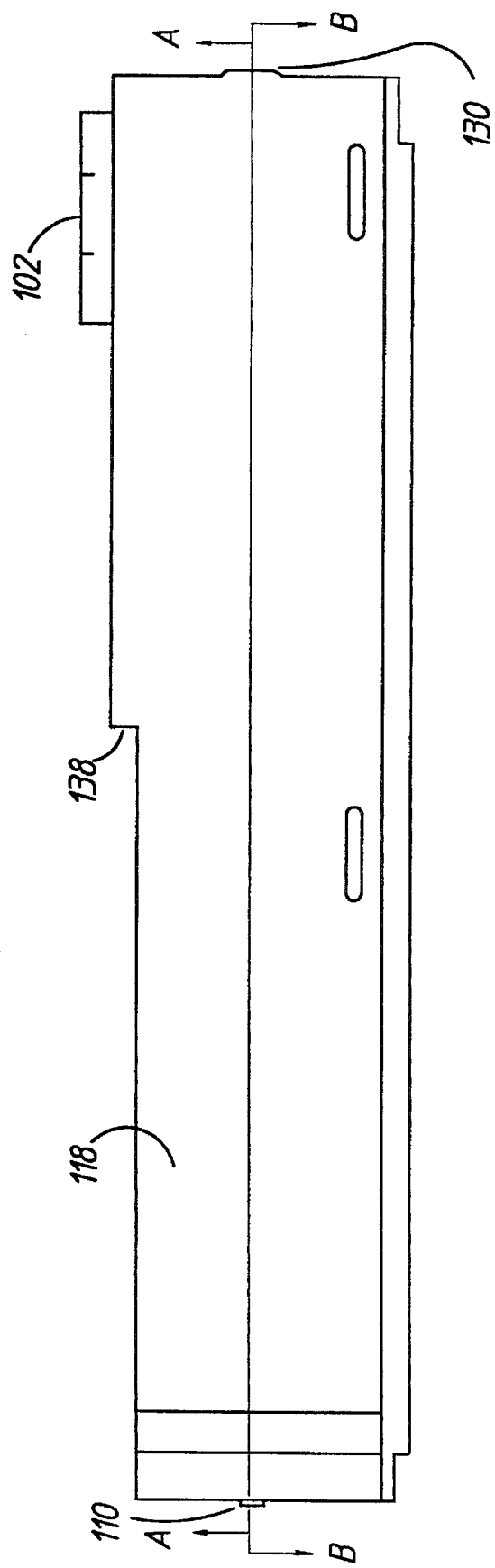
FIG. 8 shows a top view of the power supply cover according to the present invention.
Figure 9:
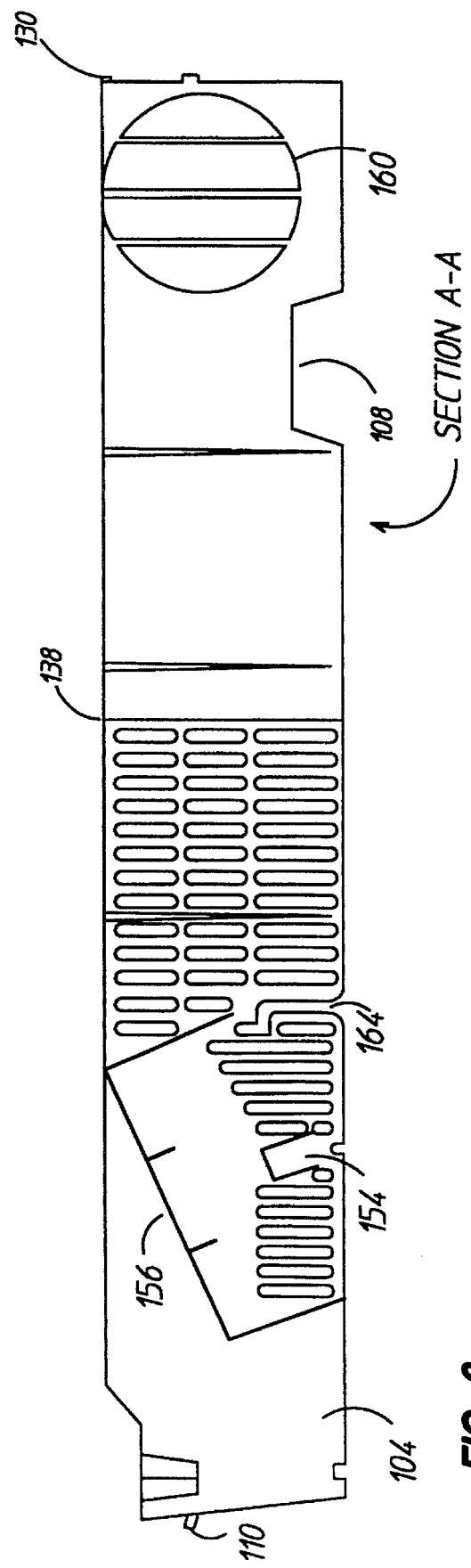
FIG. 9 shows a cut-away side view along the A—A perspective of the power supply cover according to the present invention.
Figure 10:
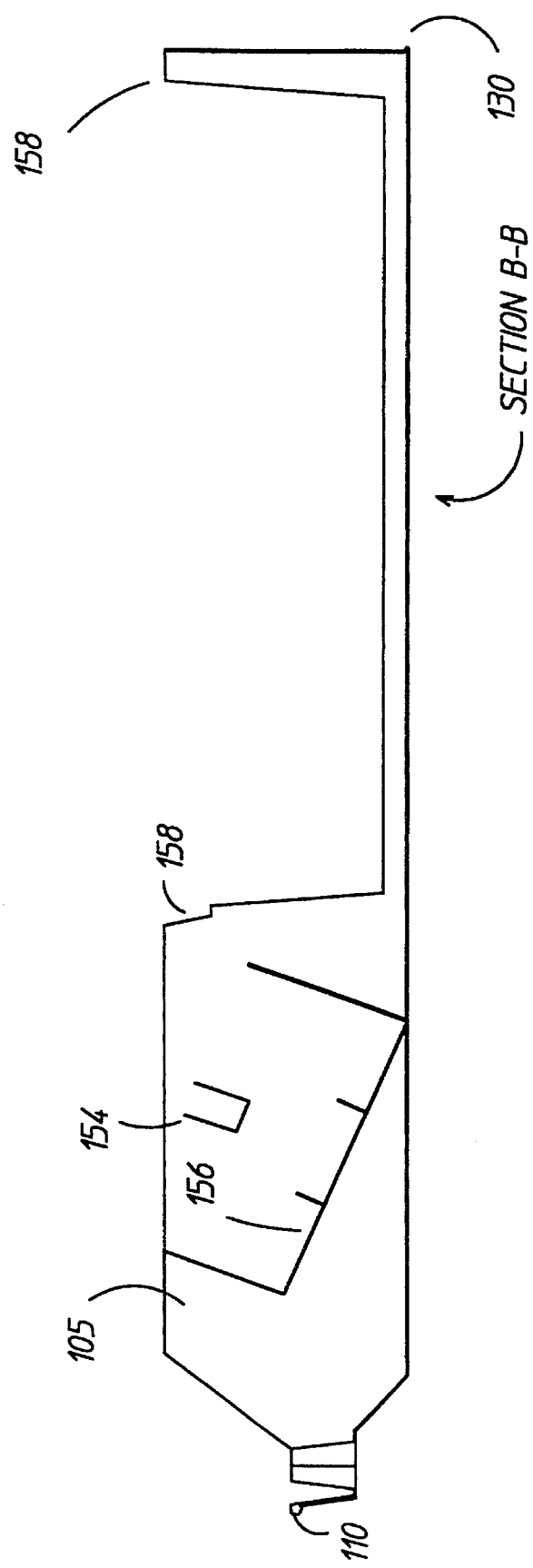
FIG. 10 shows a cut-away side view along the B—B perspective of the power supply cover according to the present invention.

As can be seen in FIGS. 6 and 7, power supply cover 100 has a further function of securing the power supply P.C. board in place against lateral and vertical movement. This function is accomplished via tabs 158 inside the power supply cover 100.

FIGS. 1 and 2 depict another feature of power supply cover 100, which is a hole 108 that permits power supply cables 112 to exit the power supply P.C. board and be routed to other areas of the computer chassis 106.

Another function of power supply cover 100 is to provide support for a monitor (not shown) which is generally placed on top of the computer chassis 106. This function is accomplished by means of power supply cover wall 104 which is made stronger by placing a bend 138 at an approximately half way point on the wall 104. Bend 138 in wall 104 prevents wall 104 from buckling under the weight of a computer monitor.

Figure 4:
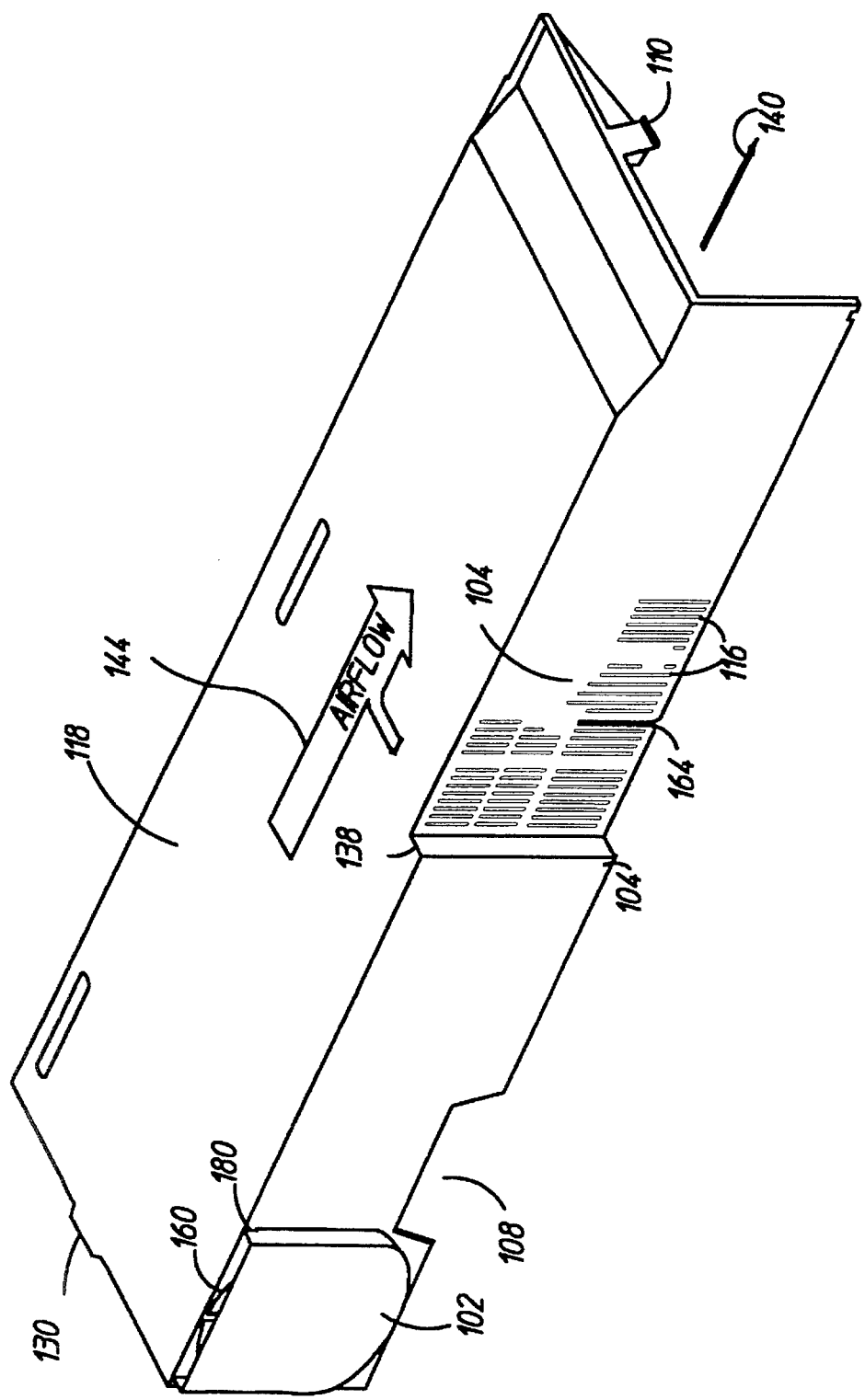
FIG. 4 shows a top/front side perspective view of the power supply cover according to the present invention.
Figure 5:
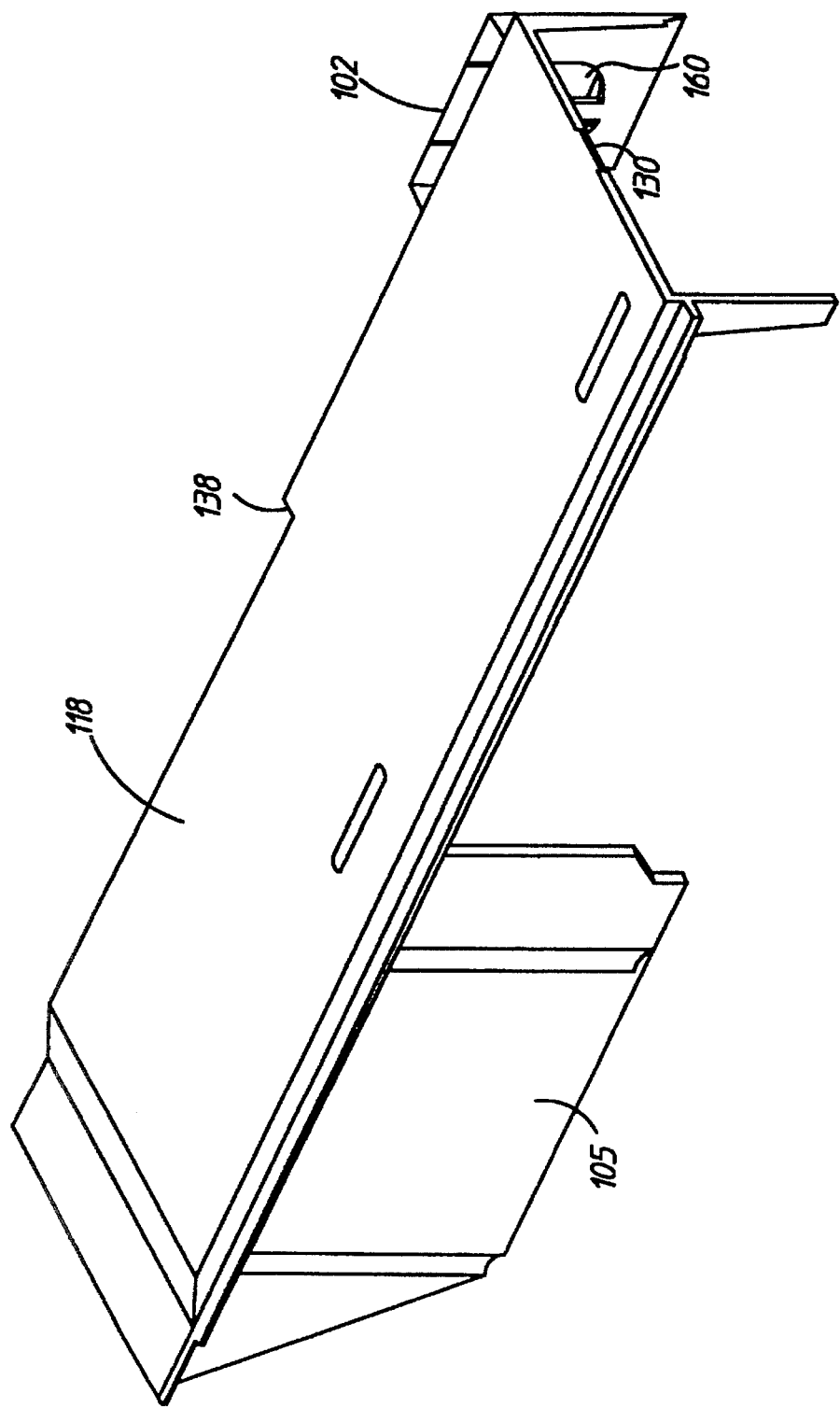
FIG. 5 shows a top/back side perspective view of the power supply cover according to the present invention.

A further feature of power supply cover 100 is shown in FIGS. 1–10, wherein the power supply cover 100 is used to house a fan 134 for cooling the power supply P.C. board 120 and other electronic components inside the main computer chassis 106. Fan 134 is held by support/guide ribs 156 and snap tabs 154 in a snap fit fashion between the walls on the underside of power supply cover 100. The fan is directed in such a manner that air is pulled from outside the main chassis area 106 through holes 136 in the back of chassis 106 and holes 152 in the front of chassis 106 and into holes 116 in wall 104 of power supply 100 and directed out of the back end 140 of power supply cover 100 and computer chassis 106 through holes 142 as shown by airflow arrow 144 (FIG. 4). Air is also drawn from the front of computer chassis 106 via chassis holes 150, across power supply P.C. board 120, through the power supply cover 100, out of power supply cover 100 via open end 140, and out of the chassis via holes 142. Fan cable 114 exits the power supply cover 100 via a slot 164 in wall 104 of the power supply cover 100.

To assemble, the power supply P.C. board 120 is mounted inside the computer chassis 106. The fan 134 is snapped into the snap tab 154 and support/guide ribs 156 structure under the power supply cover 100, making sure the fan cable 114 is routed through slot 164. The speaker 124 is slid into speaker pocket 102, making sure speaker cable 126 is routed through speaker cable notch 180. The power supply cover 100 is then lowered onto the power supply P.C. board 120, making sure the power supply cables 112 exit the power supply cover 100 via window 108. Tab 130 is aligned with a notch (not shown) in a front wall of the computer chassis 106. The Power supply cover 100 is then rotated downward until latch 110 snaps into a hole 122 in the back of computer chassis 106.

Once assembled, the power supply cover 100 provides safety from dangerous voltages from the power supply P.C. board 120 and from the fan 134. Power supply cover 100 secures power supply P.C. board 120 against movement. The power supply cover 100 also provides support for the fan and channels the air flow across the power supply P.C. board 120 and from the computer chassis 106 in general. The power supply cover 100 further supports the speaker 124, provides a back baffle for the speaker 124, and channels the sound from the computer chassis 106. And finally, wall 104 with bend 138 of power supply cover 100 provides structural support when heavy objects are stacked on top of the computer chassis (e.g. a monitor).

The foregoing description of the present invention has been presented for purposes of illustration and description. It is not intended to be exhaustive or to limit the invention to the precise form disclosed, and other modifications and variations may be possible in light of the above teachings. For example, any single feature of the power supply cover may be modified without departing from the overall gist of the invention. Moreover, the exact structure of the power supply may be changed without departing from the focus of the invention. Further still, the concepts of the present invention are not limited to computer assemblies, but can be utilized in any electronic assembly that requires a power supply printed circuit board. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic assembly comprising:

a power supply printed circuit board, said power supply printed circuit board being housed in a power supply cover, said power supply printed circuit board and said power supply cover being housed in an electronic chassis, said power supply cover comprising:

a means for securing said power supply printed circuit board against movement in said electronic chassis, said means for securing said power supply printed circuit board being integral with said power supply cover;

a means for supporting a fan so that air may be channeled across said power supply primed circuit board, said means for supporting a fan being integral with said power supply cover;

a means for supporting a speaker, said means for supporting a speaker being integral with said power supply cover; and a means for providing structural support to said electronic chassis, said means for providing structural support to said electronic chassis being integral with said power supply cover.

2. The power supply cover according to claim 1 wherein said means for supporting said fan comprises a fan support/guide ribs means that is an integral pan of said power supply cover.

3. The power supply cover according to claim 2, further comprising a means for channeling air from a main area of said electronic chassis and out of said electronic chassis.

4. The power supply cover according to claim 1 wherein said means for supporting said speaker includes a back baffle means and a means for sound to exit said electronic chassis.

5. The power supply cover according to claim 4 wherein said means for supporting said speaker comprises a speaker pocket.

6. The power supply cover according to claim 1 wherein said means for providing structural support to said electronic chassis comprises a bent wall that is an integral part of said power supply cover.

7. An electronic assembly comprising;

a power supply printed circuit board said power supply printed circuit board being housed in a power supply cover, said power supply printed circuit board and said power supply cover being housed in an electronic chassis, said power supply cover comprising:

a plurality of tabs for securing said power supply printed circuit board against movement in said electronic chassis, said plurality of tabs being integral with said power supply cover;

support/guide ribs for supporting a fan so that air may be channeled across said power supply printed circuit board;

holes in said power supply cover for channeling air from a predetermined hot spot in said electronic chassis;

a speaker pocket for supporting a speaker, said speaker pocket being integral with said power supply cover; and a bent wall for providing structural support to said electronic chassis, said bent wall being integral with said power supply cover and being located along a wall of said power supply cover that is situated relatively close to a central portion of said electronic chassis.

8. An electronic assembly comprising:

a power supply printed circuit board, said power supply printed circuit board being housed in a power supply cover, said power supply printed circuit board and said power supply cover being housed in an electronic chassis, said power supply cover comprising:

tabs that secure said power supply printed circuit board to said electronic chassis;

a speaker support with a back baffle and a means for channeling sound from said electronic chassis;

a fan support that channels air flow across said power supply printed circuit board and out of said electronic chassis;

holes located in predetermined locations along outer walls of said power supply cover that channel air from a main area of said electronic assembly and out of said electronic chassis; and a bent wall that provides structural support that said electronic chassis.

9. The power supply cover assembly according to claim 8 wherein said power supply cover is an integral plastic unit.

* * * * *